United States Patent [19]

Leung

[11] Patent Number: 5,778,248
[45] Date of Patent: Jul. 7, 1998

[54] FAST MICROPROCESSOR STAGE BYPASS LOGIC ENABLE

[75] Inventor: Arthur T. Leung, Sunnyvale, Calif.

[73] Assignee: Sun Microsystems, Inc., Palo Alto, Calif.

[21] Appl. No.: 664,478

[22] Filed: Jun. 17, 1996

[51] Int. Cl.$^6$ .................................................. G06F 9/38
[52] U.S. Cl. ........................................ 395/800.23; 395/394
[58] Field of Search ......................... 395/800.23, 391, 395/800.24, 393, 394

[56] References Cited

U.S. PATENT DOCUMENTS

| | | | |
|---|---|---|---|
| 5,040,107 | 8/1991 | Duxbury et al. | 395/392 |
| 5,043,868 | 8/1991 | Kitmura et al. | 395/394 |
| 5,467,476 | 11/1995 | Kawasaki | 395/800.23 |
| 5,471,626 | 11/1995 | Carnevale et al. | 395/395 |
| 5,522,052 | 5/1996 | Inoue et al. | 395/392 |
| 5,537,561 | 7/1996 | Nakajima | 395/392 |
| 5,590,365 | 12/1996 | Ide et al. | 395/394 |
| 5,600,848 | 2/1997 | Sproull et al. | 395/800.42 |
| 5,636,353 | 6/1997 | Ikenaga et al. | 395/394 |
| 5,638,526 | 6/1997 | Nakada | 395/394 |

*Primary Examiner*—Larry D. Donaghue
*Attorney, Agent, or Firm*—Townsend and Townsend and Crew LLP

[57] ABSTRACT

A method and apparatus for determining data dependencies and enabling bypass logic in parallel. In particular, a given stage in a given execution unit will (1) compare its destination register to the destination registers of the initial stage in each execution unit, and (2) combine the result of the comparison with the propagated results of preceding stages in the given execution unit. The other stages are not checked, as this is covered by similar checking logic in the earlier stages, with the results being passed on to the subsequent stages.

19 Claims, 3 Drawing Sheets

FAST MICROPROCESSOR STAGE BYPASS LOGIC ENABLE

BACKGROUND OF THE INVENTION

The present invention relates to RISC microprocessors which use multiple functional units which are pipelined, and in particular to the mechanisms used to bypass the writing of results to a register file in order to improve performance by using those results before they are written to the register file.

One of the key advantages of reduced instruction set computing (RISC) microprocessors is the ability to process instructions at a very high rate. Part of this is due to the clock speed, and part of it is due to the use of multiple functional units in parallel, so that, in any one cycle, multiple functions are being performed on different instructions. In addition, pipelining is used so that each functional unit also moves its instructions through the pipeline each cycle. For example, a system with four function units used at a time and a nine-stage pipeline could have 9×4=36 instructions being processed at any one time. The instructions issued in the same cycle are referred to as an instruction group.

The use of pipelining and multiple stages in multiple function units means that often data needed by one instruction in one stage of the pipeline is dependent upon the results of an instruction in another stage of the same or other execution unit. Accordingly, the data dependencies must be determined to ensure that the register file is written to with the correct results prior to an instruction accessing its input data which is provided by another instruction in another stage. High-speed microprocessors often provide bypass logic to enable the data to be obtained directly from the other stage, rather than waiting for it to be written to the destination register in the register file. However, for such bypass logic to be used, it must first be determined whether the stage whose writing is being bypassed is itself dependent upon the results of another instruction, which it is waiting for. Typically, data dependency check logic is provided at each stage to check whether the same destination register is used by any other instruction in the pipeline. The check is typically done serially, and can slow down the processing speed.

An example of the problem is set forth below, with group 1 being a first group of instructions dispatched to three execution units in parallel, and group 2 being a second group of three instructions dispatched to the same execution units, with the first group then being moved to stage 2 of the pipeline in each execution unit.

```
shift -> r1    (this is group #1)
sub -> r1
load -> r1
------
set -> r1      (this is group #2)
clr -> r1
mul -> r1
------
add r1 + r1    (this reads r1)
```

The add instruction should get its operand from the result of the mul instruction. However, all six instructions in groups 1 and 2 write r1.

It would be desirable to be able to perform this check without slowing down the microprocessor execution.

SUMMARY OF THE INVENTION

The present invention provides a method and apparatus for determining data dependencies and enabling bypass logic in parallel. In particular, a given stage in a given execution unit will (1) compare its destination register to the destination registers of the initial stage in each execution unit, and (2) combine the result of the comparison with the propagated results of preceding stages in the given execution unit. The other stages are not checked, as this is covered by similar checking logic in the earlier stages, with the results being passed on to the subsequent stages.

In a preferred embodiment, a single bit is used to indicate the result of the comparison, and is stored as a tag for the instruction associated with a given stage. Preferably, the comparison is done in advance of the instruction entering that stage, so that the results are available prior to any attempt to bypass the results of that stage, thus ensuring that no slowdown of the microprocessor operation will occur.

In one embodiment, the data dependency check logic includes a number of comparators, with each comparator having a first input provided with the destination register address of the given stage, and a second input which receives the destination register address of each of the initial stages in the execution units. The outputs of the comparators are provided to an OR-gate. The OR-gate also receives an input from similar logic in the immediate preceding stage of the given execution unit. The output of the OR-gate is provided as a single bit to the tag for that instruction to enable or disable bypassing logic associated with that stage.

For a further understanding of the nature and advantages of the invention, reference should be made to the following description taken in conjunction with the accompanying drawings.

DESCRIPTION OF THE PREFERRED EMBODIMENT

Figure 1:
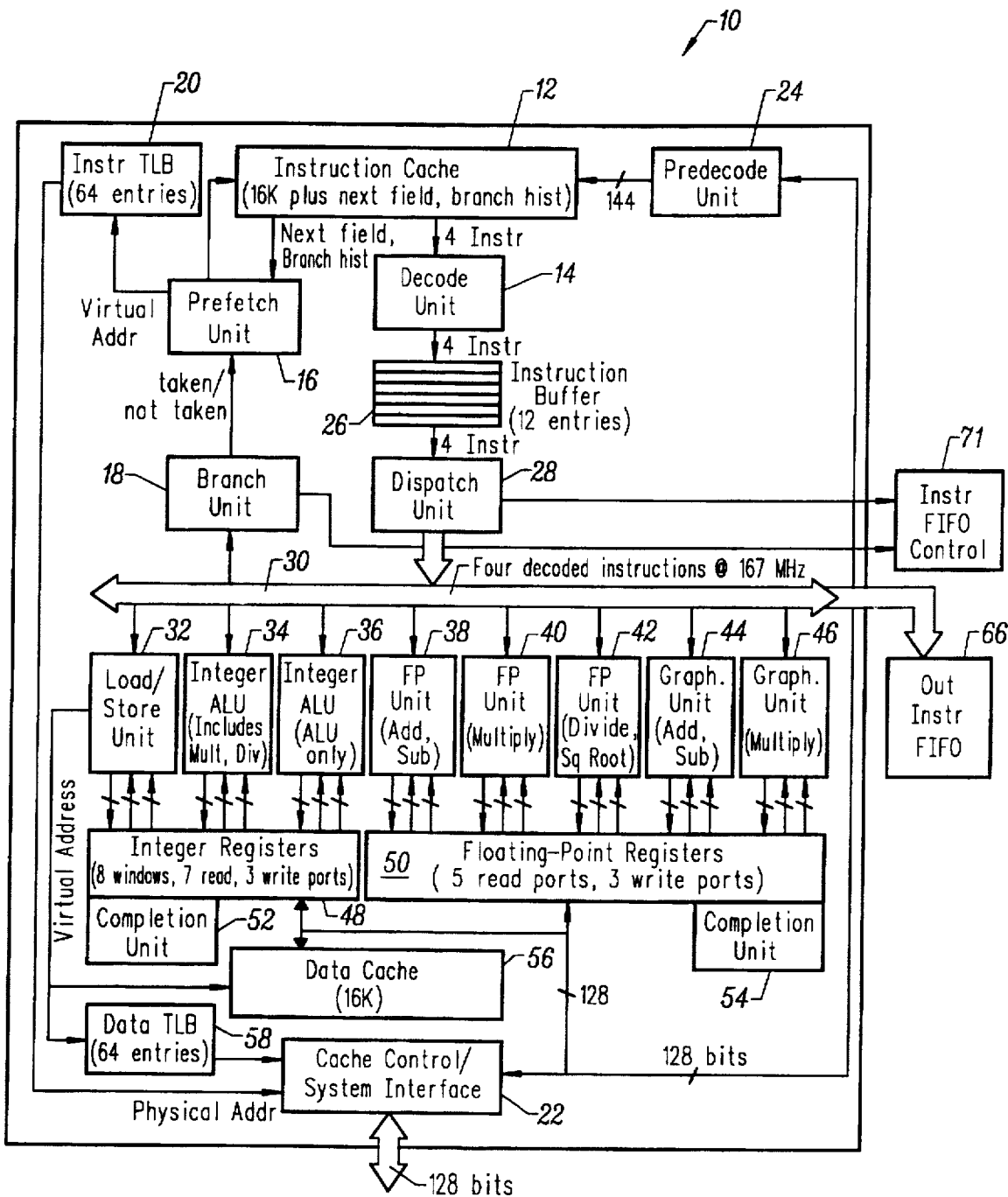
FIG. 1 is a block diagram of a microprocessor which can incorporate the present invention.

FIG. 1 is a block diagram of an UltraSparc™ microprocessor 10 which could be modified to incorporate the present invention. An instruction cache 12 provides instructions to a decode unit 14. The instruction cache can receive its instructions from a prefetch unit 16, which either receives instructions from branch unit 18 or provides a virtual address to an instruction TLB (translation look-aside buffer) 20, which then causes the instructions to be fetched from an off-chip cache through a cache control/system interface 22. The instructions from the off-chip cache are provided to a pre-decode unit 24 to provide certain information, such as whether it is a branch instruction, to instruction cache 12.

Instructions from decode unit 14 are provided to an instruction buffer 26, where they are accessed by dispatch unit 28. Dispatch unit 28 will provide four decoded instructions at a time along a bus 30, each instruction being provided to one of eight functional units 32–46. The dispatch unit will dispatch four such instructions each cycle, subject to checking for data dependencies and availability of the proper functional unit.

The first three functional units, the load/store unit 32 and the two integer ALU units 34 and 36, share a set of integer registers 48. Floating-point registers 50 are shared by floating point units 38, 40 and 42 and graphical units 44 and 46. Each of the integer and floating point functional unit groups have a corresponding completion unit, 52 and 54, respectively. The microprocessor also includes an on-chip data cache 56 and a data TLB 58.

An outstanding instruction FIFO 66 contains information on each instruction in the function unit pipeline. It is controlled by instruction FIFO control logic 71.

Figure 2:
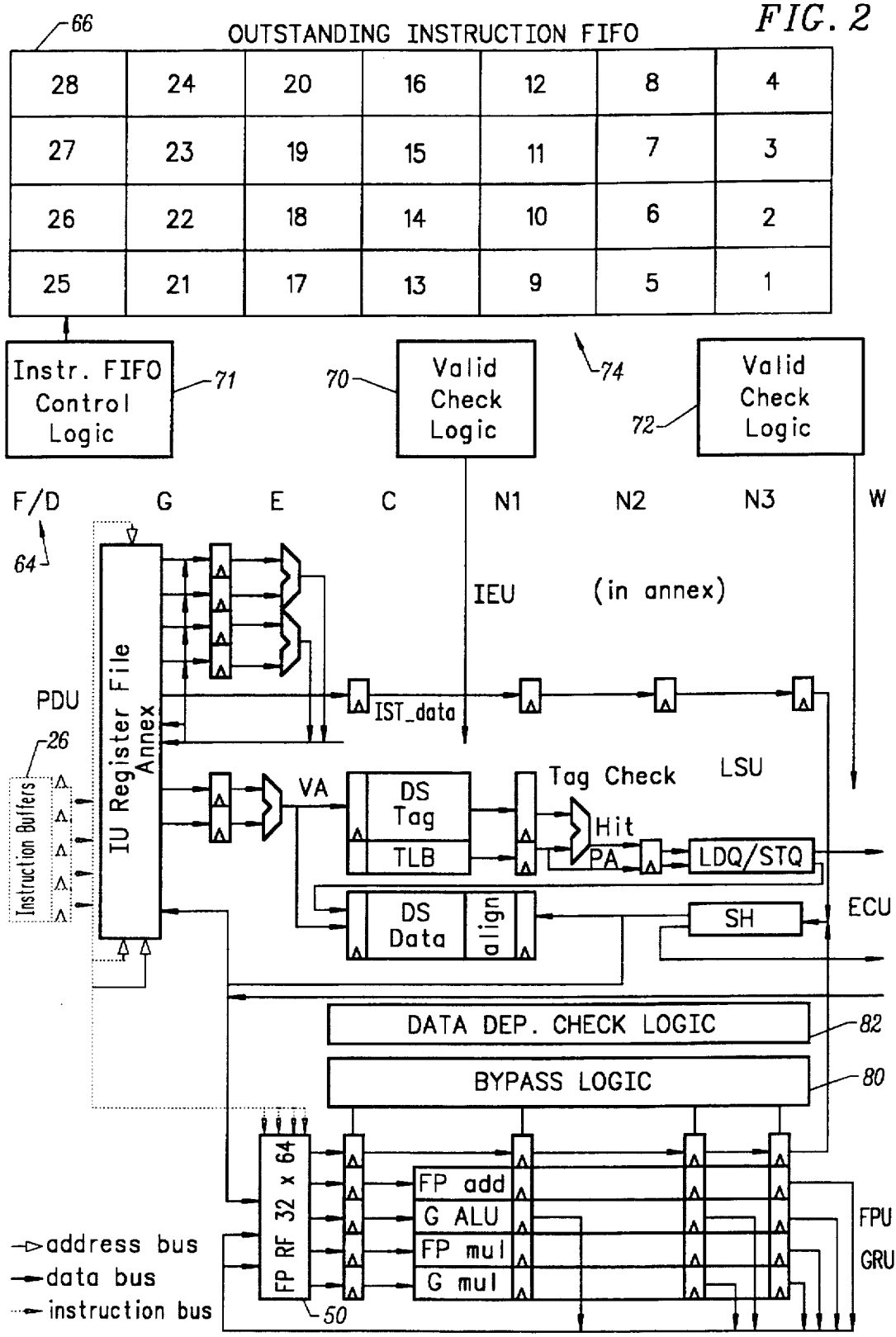
FIG. 2 is a block diagram of multiple stages of the microprocessor of FIG. 1 including the bypass logic of the present invention.

FIG. 2 illustrates in more detail the stages of some of the pipelines of FIG. 1. In particular, the floating point registers 50 are shown at the bottom, with the 5 floating point and graphical functional units being shown. The different stages of the pipeline are illustrated by the letters in line 64 in the middle of the diagram. At the top of FIG. 2, an outstanding instruction FIFO 66 is illustrated. As shown, the FIFO has 7 rows corresponding to 7 stages or cycles of the pipeline, with corresponding instructions being stored in 4 positions in each row, extending from 1 through 28 as shown. Each row thus stores an instruction group. The instructions corresponding to the positions in the FIFO will be found in the pipeline at the same cycle in the functional units. Instruction FIFO control logic 71 controls the operation of outstanding instruction FIFO 66.

The different stages shown are as follows. F/D stage is the stage where instructions are fetched from the cache. The D portion of this stage is for decoding of instructions and placing them in the instruction buffer 26. In stage G, up to 4 instructions, depending upon data dependency and functional unit requirements, are dispatched and the register files are accessed. Note that less than 4 instructions may be sent depending upon data dependencies, if the data needed by an instruction is not yet available. Alternately, if multiple instructions require the same functional unit, less than 4 instructions may be dispatched if an equivalent function unit is not available.

In stage E, execution occurs in the ALU, and the memory address is calculated. In stage C, the FPU calculation is started and the on-chip data cache and TLB are checked. Stage N1 is the second stage of the floating point calculation, and stage N2 is a floating point unit completion stage. Stage N3 allows a resolution of traps or errors and stage W is for the writing back of results to the register files.

Two sets of valid check logic are provided, a valid check logic 70 and valid check logic 72. Valid check logic 70 determines whether the instructions in the fourth stage of the pipeline, indicated as 74 in outstanding instruction FIFO 66, are valid. At this point, if the instructions are invalidated, the accessing of off-chip memory and its associated requirement of many cycles is avoided. Valid check logic 72 determines at the output of the pipeline whether the instructions are valid to prevent invalid results being written into the register files.

FIG. 2 also shows bypass logic 80, coupled to the various stages of the pipeline. The bypass logic allows a particular stage to obtain data from another stage without waiting for it to be written to the register file. The present invention adds unique data dependency check logic 82 which is coupled to bypass logic 80 and to the various stages. In the prior art, the data dependency check logic would typically check serially through each of the stages to determine whether a stage sought to be bypassed has its destination register overwritten by a younger instruction.

Figure 3:
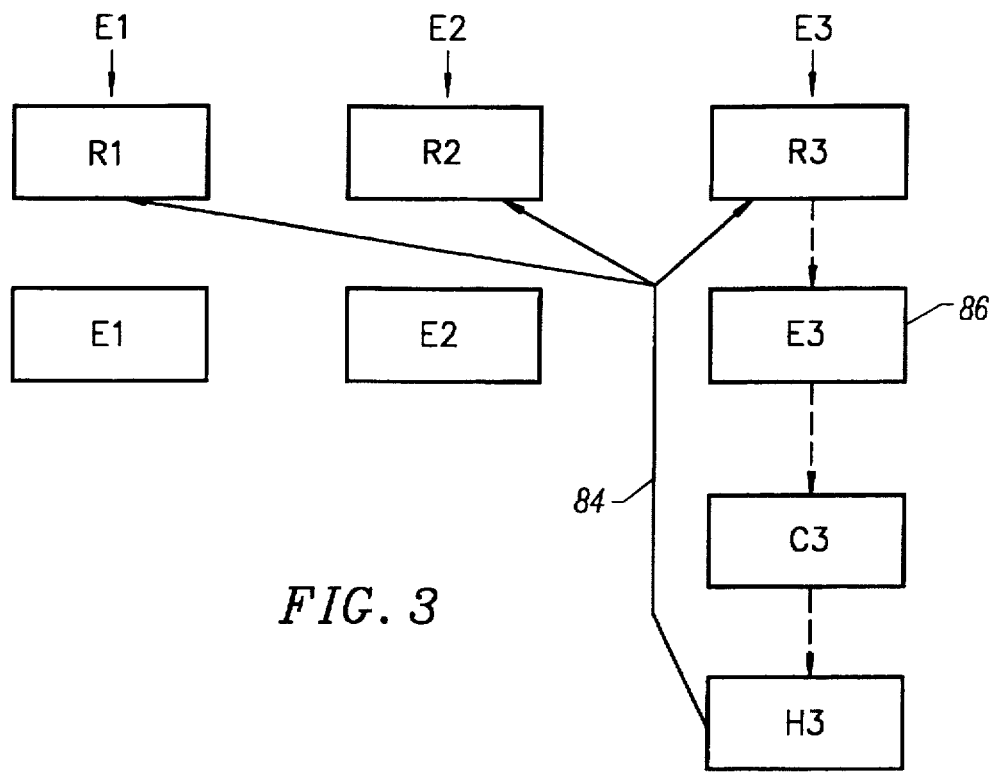
FIG. 3 is a diagram illustrating the stages checked by a given stage according to the present invention.

FIG. 3 is a block diagram illustrating three different instruction units, E1, E2 and E3. Each has multiple stages, with two stages being shown for E1 and E2, and four stages for E3. The following example illustrates the operation of the invention using stage H3 as an example. The logic for other stages will vary, but use the same concept. Arrows 84 illustrate the stages which need to be checked by data dependency logic is a stage H3. Rather than checking all of the stages in all of the execution units, stage H3 only needs to check the initial stages in each execution unit (R1, R2 and R3) and combine this with the propagated results from the preceding stages as indicated by a dotted line.

The subsequent stages in execution units E1 and E2 need not be checked, because the instructions there would have been compared in block 86 (execution unit E3) when they were in the initial stage, before the are propagated to the second stage. The results of E3 are passed on to C3 which subsequently passes its results on to H3. Thus, H3 will have available from C3 a result which takes into account the checking done at all the earlier stages which will pick up all the instructions propagating forward, except for the youngest instructions which have just entered into the initial stages of each of the execution units.

Figure 4:
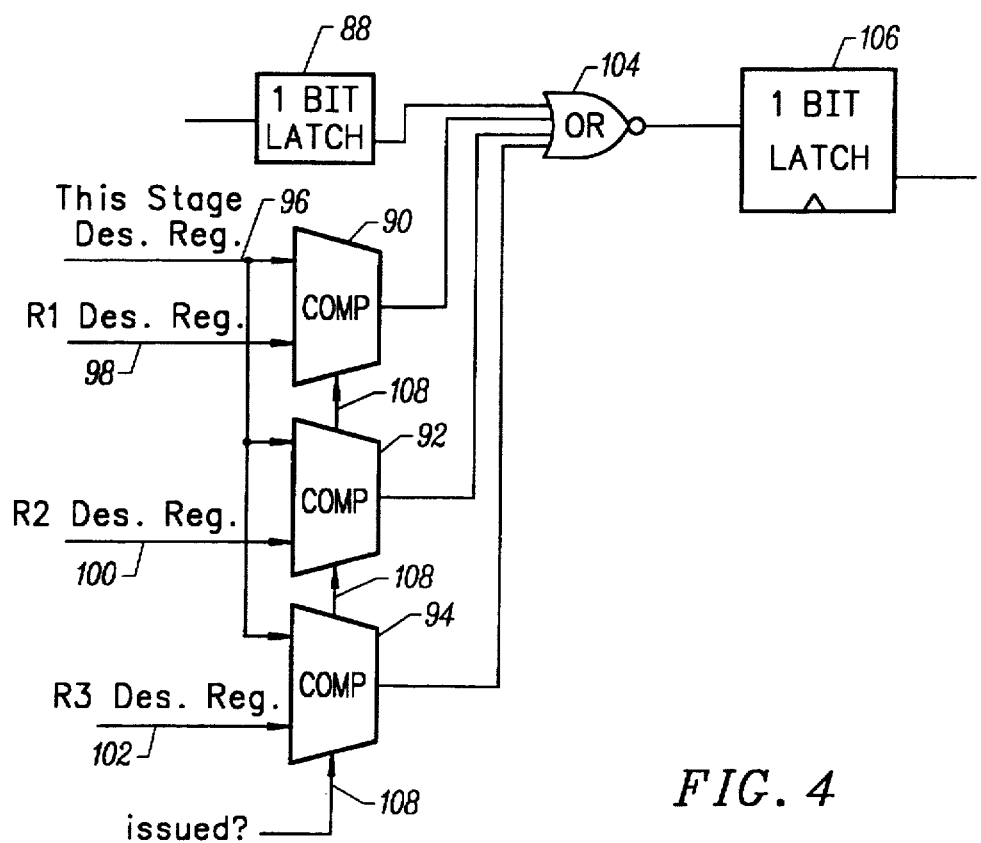
FIG. 4 is a diagram of the data dependency check logic of the present invention.

FIG. 4 illustrates the data dependency check logic 82 for a particular stage. A 1-bit latch 88 stores the result from the previous stages' data dependency check logic (the first stage would not have this). A series of comparators 90, 92 and 94 compare the destination register for the current stage on line 96 with the destination registers for initial stages R1, R2 and R3 of each of the execution units on lines 98, 100 and 102. The results of the comparators, along with the results of the previous stages' comparison in register 88, are provided to a NOR-gate 104. The output of the NOR-gate is provided to A 1-bit latch 106, which tags the instruction for the current stage. Note that a NOR gate and the inverting output of the latch are used to increase speed. Alternately, an OR gate or other logic could be used.

The bit in latch 106, which tags the instruction, can be provided directly to enable logic for the bypass logic of the current stage, or can be added as a tag bit in a field associated with the instruction in outstanding instruction FIFO 66, as shown in FIG. 2. A separate input on a line 108 to each of the comparators enables the comparators only if the instructions have actually been confirmed as issued in each of stages R1, R2 and R3.

When a subsequent bypass is attempted, the bypass logic will be appropriately enabled or disabled. Alternately, in another possible embodiment, the bypass logic may be usable, but the logic attempting to access the bypass logic from a different stage will check the tag in the instruction FIFO, and not use the bypass logic if it is tagged as not bypassable.

As will be understood by those of skill in the art, the present invention may be embodied in other specific forms without departing from the spirit or essential characteristics thereof. Accordingly, the foregoing description is intended to be illustrative, but not limiting, of the scope of the invention which is set forth in the following claims.

What is claimed is:

1. A microprocessor comprising:
   a plurality of execution units, each execution unit having a plurality of stages;
   a register file coupled to a plurality of said execution units;
   bypass logic, coupled to a plurality of said stages, configured to provide data from one of said stages to another stage before said data is written to said register file;
   data dependency check logic, associated with a given stage in a given execution unit, having an output coupled to an enable input of said bypass logic for said given stage, configured to compare a destination register of said given stage with a destination register for an initial stage of a plurality of said execution units and subsequent stages of only said given execution unit.

2. The microprocessor of claim 1 wherein said data dependency check logic is coupled to only an immediately preceding stage of said given execution unit.

3. The microprocessor of claim 1 wherein said enable input of said bypass logic is a tag associated with the instruction in the stage of said bypass logic.

4. The microprocessor of claim 3 further comprising enable logic for testing said tag to determine if said bypass logic can be used.

5. The microprocessor of claim 4 wherein said enable logic is in a separate stage attempting to access said bypass logic.

6. The microprocessor of claim 4 wherein said enable logic is in said bypass logic.

7. The microprocessor of claim 1 wherein said data dependency check logic comprises:

a plurality of comparators, each comparator having a first input coupled to a register destination code for said given stage, and a second input coupled to a register destination code for an initial stage of one of said execution units;

a check register indicating a data dependency check logic result of a preceding stage in said given execution unit; and a OR gate having inputs coupled to outputs of each of said comparators and said check register.

8. The microprocessor of claim 7 wherein said check register is a single bit register.

9. The microprocessor of claim 1 wherein said data dependency check logic performs said comparison for an instruction entering said given stage in a next cycle, such that a result of said comparison is available prior to accessing of said bypass logic by another stage.

10. A microprocessor comprising:

a plurality of execution units, each execution unit having a plurality of stages;

a register file coupled to a plurality of said execution units;

bypass logic, coupled to a plurality of said stages, configured to provide data from one of said stages to another stage before said data is written to said register file;

data dependency check logic, associated with a given stage in a given execution unit, having an output coupled to an enable input of said bypass logic for said given stage, configured to compare a destination register of said given stage with a destination register for an initial stage of a plurality of said execution units and only an immediately preceding stage of said given execution unit; and wherein said data dependency check logic performs said comparison for an instruction entering said given stage in a next cycle, such that a result of said comparison is available prior to accessing of said bypass logic by another stage.

11. A computer system comprising:

a main memory;

a bus coupled to said main memory;

a processor coupled to said bus, said processor including a plurality of execution units, each execution unit having a plurality of stages;

a register file coupled to a plurality of said execution units;

bypass logic, coupled to a plurality of said stages, configured to provide data from one of said stages to another stage before said data is written to said register file;

data dependency check logic, associated with a given stage in a given execution unit, having an output coupled to an enable input of said bypass logic for said given stage, configured to compare a destination register of said given stage with a destination register for an initial stage of a plurality of said execution units and subsequent stages of only said given execution unit.

12. The computer system of claim 11 wherein said data dependency check logic is coupled to only an immediately preceding stage of said given execution unit.

13. The computer system of claim 11 wherein said data dependency check logic performs said comparison for an instruction entering said given stage in a next cycle, such that a result of said comparison is available prior to accessing of said bypass logic by another stage.

14. A method for operating a microprocessor, said microprocessor having a plurality of execution units, a plurality of said execution units having a plurality of stages, comprising the steps of:

bypassing a destination register by providing data from one of said stages to another stage before said data is written to a destination register;

comparing a destination register of a given stage with a destination register for an initial stage of a plurality of said execution units and subsequent stages of only said given execution unit;

disabling said providing step if said comparing step finds a match.

15. The method of claim 14 wherein said comparing step only compares to an immediately preceding stage of said given execution unit.

16. The method of claim 15 wherein comparing step writes a result of said comparing to a tag associated with the instruction in the given stage.

17. The method of claim 16 further comprising the step of:

testing said tag to determine if said bypassing step can be performed.

18. The method of claim 16 wherein said tag is a single bit.

19. The method of claim 18 wherein said comparing step is performed for an instruction entering said given stage in a next cycle, such that a result of said comparison is available prior to said bypassing step.

* * * * *